United States Patent
Hall et al.

(10) Patent No.: US 6,803,339 B2
(45) Date of Patent: Oct. 12, 2004

(54) LATENT METALLOCENE CATALYST SYSTEMS FOR OLEFIN POLYMERIZATION

(75) Inventors: Richard A. Hall, Williamston, MI (US); Jerome A. Streeky, Bolingbrook, IL (US); Roger Uhrhammer, Aurora, IL (US)

(73) Assignee: BP Corporation North America Inc., Warrenville, IL (US)

( * ) Notice: Subject to any disclaimer, the term of this patent is extended or adjusted under 35 U.S.C. 154(b) by 75 days.

(21) Appl. No.: 10/242,475

(22) Filed: Sep. 12, 2002

(65) Prior Publication Data

US 2003/0104927 A1 Jun. 5, 2003

Related U.S. Application Data

(60) Provisional application No. 60/322,342, filed on Sep. 14, 2001.

(51) Int. Cl.$^7$ ............................ B01J 31/00; B01J 37/00; C08F 4/02; C08F 4/60; C08F 10/00
(52) U.S. Cl. ..................... 502/117; 502/102; 502/108; 502/109; 526/160
(58) Field of Search ................................ 502/117, 102, 502/103, 108, 109; 526/160

(56) References Cited

U.S. PATENT DOCUMENTS 5,599,761 A * 2/1997 Turner ........................ 502/152
5,962,607 A * 10/1999 Yamamoto et al. ............ 526/88
6,365,779 B2 * 4/2002 Devore et al. ................. 568/1

FOREIGN PATENT DOCUMENTS

| EP | 0188914 | 7/1986 | |
|---|---|---|---|
| EP | 0729983 | 9/1996 | |
| EP | 0748823 | 12/1996 | |
| JP | EP 0748823 A1 * | 12/1996 | ........... C08F/10/00 |
| JP | EP 0729983 A3 * | 1/1998 | ......... C08F/210/02 |
| US | EP 0630910 A1 * | 12/1994 | ........... C08F/10/00 |
| WO | WO 03/025029 A1 * | 3/2003 | ........... C08F/10/00 |

OTHER PUBLICATIONS

US 2003/0054943 A1 (Kimberley).*

S. Mansel et al., "Stable rac –[1,2–Ethylene–1, 1'–bis($\eta^5$–tetrahydroindenyl)]–zirconacyclopentanes. Synthes s, X–ray Crystal Structures, Stability, and Catalysis of Ethylene Polymerization," Organometallics (1977), 16:2886–2890.

* cited by examiner

Primary Examiner—Mark L. Bell
Assistant Examiner—Jennine Brown
(74) Attorney, Agent, or Firm—Wallace L. Oliver; Norval B. Galloway

(57) ABSTRACT

A metallocene catalyst may be temporarily and reversibly passivated by contact with an effective amount of an unsaturated hydrocarbon passivating compound.

11 Claims, No Drawings

LATENT METALLOCENE CATALYST SYSTEMS FOR OLEFIN POLYMERIZATION

CROSS-REFERENCE TO RELATED APPLICATIONS

This application claims the benefit of U.S. Provisional Application No. 60/322,342, filed Sep. 14, 2001, which is incorporated by reference herein.

FIELD OF THE INVENTION

This invention is directed to metallocene catalyst systems for olefin polymerization. More particularly, the invention is directed to a method for temporarily and reversibly passivating metallocene catalysts to provide metallocene compositions useful as latent olefin polymerization catalysts.

The latent olefin polymerization catalysts of this invention, when activated, are particularly useful in the polymerization of alkenes, including 1-olefins such as propylene, in a gas-phase reactor.

BACKGROUND OF THE INVENTION

The process technology for the manufacture of polypropylene (PP) has evolved with improvement in catalyst technology, from complex slurry processes using an inert hydrocarbon diluent, to simpler bulk processes using liquid propylene diluent, to even more simplified gas phase processes.

Gas phase reactor processes widely known and well described in the art include those based on continuously stirred tank reactor and fluid bed technologies. Examples of such reactor systems are described in U.S. Pat. Nos. 3,957,448; 3,965,083; 3,971,786; 3,970,611; 4,129,701; 4,101,289; 3,652,527; and 4,003,712, all incorporated herein by reference. Typical gas-phase olefin polymerization reactor systems comprise at least one reactor vessel to which olefin monomer and catalyst components can be added and which contain an agitated bed of forming polymer particles. Generally, catalyst components are added together or separately through one or more valve-controlled ports in the single or first reactor vessel. Olefin monomer may be provided to the reactor through a recycle gas system in which unreacted monomer removed as off-gas and fresh feed monomer are mixed and injected into the reactor vessel. Polymerization will be carried out under conditions that exclude oxygen, water, and other materials that act as catalyst poisons. Polymer molecular weights are controlled through use of additives such as hydrogen in a manner well known to persons of skill in the art.

The Amoco Gas Phase Process may be generally characterized as being conducted using two horizontal, stirred-bed, gas phase reactors in series. The plug-flow reactors employ an interlock system separating the first stage homopolymer reactor from the second stage copolymer reactor. The process provides an inherently narrow residence time distribution coupled with optimized stirring, minimizing temperature variations and resulting in greater product consistency. The Amoco process is disclosed generally in "Polypropylene Handbook" pp. 297–298, Hanser Publications, N.Y. (1996), and is more fully described in U.S. Pat. No. 3,957,448 and in "Simplified Gas-Phase Polypropylene Process Technology" presented in Petrochemical Review March, 1993. The teachings of these publications and the patent are hereby incorporated in their entirety by reference.

Rubber-modified polypropylene resins are prepared commercially for the most part by post-blending separately produced homopolymer and copolymer resins in a compounding operation. In-reactor processes wherein homopolymer formed from the first monomer in a first reactor is subsequently reacted with the second monomer in a second reactor have also been disclosed and described in the art. Gas phase reactor processes such as are described in Hydrocarbon Processing 74 pp. 140–142 are disclosed to be useful for the production of impact PP resins. The two-stage horizontal gas phase reactor described in Polyolefins VI SPE RETEC, Houston, Tex. (1991), page 68 has also been employed in the production of impact polypropylene. Processes for use in the manufacture of copolyolefins have been further described in Petrochemical Review, March, 1993, in U.S. Pat. No. 3,957,448 and in Chemical Engineering Science Vol. 47, no. 9–11 (1992) pp. 2591–2596.

The polymerization catalysts conventionally employed in these processes have generally been Ziegler-Natta type catalysts. For example, the Amoco gas phase process is disclosed in the art to employ fourth generation supported catalysts consisting of three components: a proprietary solid CD catalyst, a trialkylaluminum activator or cocatalyst, and an external modifier or donor. Separately, the catalyst components are inactive. Hence the CD catalyst and activator may be suspended in propylene and fed to the reactor as separate streams without initiating polymer formation in the feed lines.

Recently there has been developed a practical catalyst technology based on metallocene compounds, termed sixth generation catalysts by E. Albizzati et al. in "Polypropylene Handbook". Metallocene catalysts, more particularly described as Group 4 or 5 metallocenes, are soluble organic complexes that result from the reaction of biscyclopentadienyl transition metal complexes (metallocenes) with a cocatalyst, generally an aluminum compound. Most metallocene catalysts employed for propylene polymerization are zirconium-based, and the most widely used cocatalyst is methylaluminoxane (MAO), derived from trimethylaluminum (TMA). Other metallocene catalyst systems disclosed in the art include combinations of metallocene dialkyls with boron compounds, further including trialkylaluminum compounds.

Supported metallocene-based catalyst systems, which may be more particularly described as fully active, metallocene-based catalyst systems immobilized on a particulate carrier having narrow size distribution such as a finely divided silica, alumina, $MgCl_2$, zeolite or the like, are also known. Solution and bulk processes for ethylene and propylene polymerization employing supported metallocene-based catalysts have been disclosed and are well described in the art.

Metallocene catalysts are difficult to employ directly in conventional polymerization processes, and particularly in gas phase processes where the catalyst system will be dispersed in a hydrocarbon or in monomer and metered into the reactor through feed lines. Supported metallocene catalysts are optimally active when preactivated, i.e. combined with the cocatalyst component prior to being introduced into the reactor. Dispersing such catalysts in the olefin monomer stream for direct feed to the reactor system results in polymer formation and causes severe plugging of the feedlines. Moreover, polymerization proceeds before the catalyst system is dispersed fully and uniformly through the polymer bed in the reactor, resulting in highly active hot spots that promote the formation of lumps and plating out. The reactor rapidly becomes fouled, reducing catalyst yields and requiring frequent shutdowns to clean the reactor.

Inert gases, hydrocarbons and the like have been employed as diluents and as carriers for use with Ziegler- Natta catalysts. These methods have had some success when employed with soluble metallocene catalysts in solution and bulk polymerization systems. In gas phase processes employing continuously stirred tank reactor and fluid bed technologies, the use of such diluents and carriers for feeding supported metallocene catalyst systems to the reactor with the olefin stream has generally not been successful. Although the problem of plugging may be avoided by dispersing the supported catalyst in an inert hydrocarbon such as propane and separately metering the mixture to the reactor, it is difficult to adequately disperse the catalyst through the reactor polymer bed rapidly enough to avoid forming lumps and strings.

Temporarily reducing the activity of metallocene catalysts has been described in the art. For example, adding a dialkyborane or dialkylaluminum to the reactor during a polymerization to temporarily retard the activity of metallocene catalysts has been disclosed as a method for process control. However, catalyst activity is only partially retarded by such treatment. Catalysts directly treated with a dialkyborane or dialkylaluminum retain sufficient activity to initiate polymerization when dispersed in the monomer feed stream. Moreover, the recovery period is very brief, too brief to allow the catalyst system to be adequately dispersed in a stirred reactor gas phase reactor bed before the catalyst recovers and polymerization proceeds.

It is known that metallocene catalysts are deactivated by Lewis acids. Reactivating a Lewis acid-treated catalyst after it is dispersed in the reactor bed requires adding excess MAO, which is difficult to disperse because of its low volatility. Separately adding an alkali metal alkyl or alkaline earth metal alkyl and a fully active, supported metallocene catalyst to a reactor before contacting with monomer has been disclosed to be useful for avoiding lumps and wall formations in the suspension polymerization of ethylene polymers and copolymers. The use of Lewis bases to retard or terminate a metallocene catalyzed polymerization as a means for process control is also disclosed in the art. Restarting the polymerization, accomplished by adding excess MAO, may require adding as much MAO as was employed in the initial preparation of the catalyst. Due to poor volatility, dispersing the MAO uniformly through the reactor bed is difficult, and the polymerization activity after restart may be substantially reduced. Moreover, many Lewis base compounds are irreversible catalyst poisons. In a continuous process such poisons will accumulate in the reactor over time, requiring that the process be stopped while the reactor is cleaned.

Thus, there does not appear to be available a method for temporarily and reversibly passivating metallocene catalysts whereby catalyst activity becomes reduced to a level that will allow feeding the catalyst to the reactor in contact with olefin monomer and adequately dispersing the catalyst in the reactor polymer bed prior to reactivating.

SUMMARY OF THE INVENTION

This invention is directed to a method for temporarily and reversibly passivating metallocene catalysts wherein fully active metallocene catalysts may be temporarily and reversibly passivated by contacting with an effective amount of a passivating compound.

The temporarily and reversibly passivated metallocene catalysts of this invention, further characterized as latent olefin polymerization catalysts, will have substantially reduced activity for polymerization of olefins. The latent catalyst thus may be dispersed in an olefin monomer such as propylene, fed to the reactor and dispersed through the reactor polymer bed without polymerizing the monomer to a significant extent. Preferably, the latent catalyst will remain inactive as a polymerization catalyst for olefins under the intended operating conditions until suitably reactivated, for example, by being contacted with an effective amount of an activator in a subsequent reaction step.

The invention may be still further described and characterized as directed to a gas-phase polymerization process for the polymerization of olefins comprising reversibly passivating a conventional metallocene catalyst to provide a latent catalyst, feeding the latent catalyst to the reactor optionally in contact with monomer, then reactivating the catalyst and carrying out the polymerization.

DESCRIPTION OF THE PREFERRED EMBODIMENT(S)

The metallocene catalyst systems useful in the practice of this invention, also referred to in the art as metallocene catalysts and as metallocene catalyst complexes, comprise metallocenes selected from Groups 4 and 5 (IUPAC nomenclature) metallocenes and a suitable cocatalyst, preferably an aluminoxane cocatalyst such as methyl aluminoxane (MAO).

A great variety of metallocenes suitable for use in forming metallocene catalyst systems have been described in the art, including complexes of titanium, zirconium, hafnium, vanadium, niobium and tantalum. Illustrative of such complexes are:

dimethylsilyl-bis-(2-methyl-4;5-benzo[e]indenyl) zirconium dichloride; dimethylsilanediyl-bis-(3-tert-butyl-5-methylcyclopentadienyl) zirconium dichloride; diethylsilanediyl-bis-(3-tert-butyl-5-methylcyclopentadienyl) zirconium dichloride; methylethylsilanediyl-bis-(3-tert-butyl-5-methylcyclopentadienyl) zirconium dichloride; dimethylsilanediyl-bis-(3-tert-butyl-5-ethylcyclopentadienyl) zirconium dichloride; dimethylsilanediyl-bis-(3-tert-butyl-5-methylcyclopentadienyl)-dimethyl zirconium; dimethylsilanediyl-bis-(2-methylindenyl) zirconium dichloride; diethylsilanediyl-bis-(2-methylindenyl) zirconium dichloride; dimethylsilanediyl-bis-(2-ethylindenyl) zirconium dichloride; dimethylsilanediyl-bis-(2-isopropylindenyl) zirconium dichloride; dimethylsilanediyl-bis-(2-tert-butylindenyl)-zirconium dichloride; diethylsilanediyl-bis-(2-methylindenyl) zirconium dibromide; dimethylsulfide-bis-(2-methylindenyl) zirconium dichloride; dimethylsilanediyl-bis-(2-methyl-5-methylcyclopentadienyl) zirconium dichloride; dimethylsilanediyl-bis-(2-methyl-5-ethylcyclopentadienyl) zirconium dichloride; dimethylsilanediyl-bis-(2-ethyl-5-isopropylcyclopentadienyl) zirconium dichloride; dimethylsilanediyl-bis-(2-methylindenyl) zirconium dichloride; dimethylsilanediyl-bis-(2-methylbenzindenyl) zirconium dichloride; dimethylsilanediyl-bis-(2-methylindenyl) hafnium dichloride; dimethylsilyl-bis(2-methyl-4-phenylindenyl) zirconium dichloride; dimethylsilyl-bis(2-ethyl-4-phenylindenyl) zirconium dichloride; dimethylsilyl-bis(2-methyl-4-naphthylindenyl) zirconium dichloride; dimethylsilyl-bis-(2-ethyl-4-phenylindenyl) zirconium dichloride; dimethylsilyl-bis-(2-methyl-4-isopropylindenyl) zirconium dichloride; dimethylsilyl-bis-(2-ethyl-4-isopropylindenyl) zirconium dichloride; and isopropylidene(3-tert-butyl-cyclopentadienyl)(fluorenyl) zirconium dichloride.

Zirconium-based metallocenes have been found particularly useful in providing catalyst systems useful in the polymerization of propylene.

Metallocene catalyst systems further contain a cocatalyst. Particularly suitable are aluminoxane compounds, more particularly described as poly(hydrocarbyl aluminum oxide). Aluminoxanes are well known in the art and may be formed by reacting water with an alkylaluminum compound. Generally, in the preparation of aluminoxanes from, for example, trimethylaluminum and water, a mixture of linear and cyclic compounds is obtained.

The aluminoxanes may be prepared in a variety of ways. For example, an aluminum alkyl may be treated with water in the form of a moist solvent. Alternatively, an aluminum alkyl, for example trimethylaluminum, may be contacted with a hydrated salt such as hydrated ferrous sulfate, for example by treating a dilute solution of trimethylaluminum in toluene with a suspension of ferrous sulfate heptahydrate. It is also possible to form methylaluminoxanes by the reaction of a tetraalkyldialuminoxane containing $C_2$ or higher alkyl groups with trimethylaluminum using an amount of trimethylaluminum which is less than a stoichiometric excess. The synthesis of methylaluminoxanes may also be achieved by the reaction of a trialkylaluminum compound or a tetraalkyldialuminoxane containing $C_2$ or higher alkyl groups with water to form a polyalkylaluminoxane which is then reacted with trimethylaluminum. The synthesis of methylaluminoxanes, also known as modified aluminoxanes, by the reaction of a polyalkylaluminoxane containing $C_2$ or higher alkyl groups with trimethylaluminum and then with water is disclosed in the art, for example, in U.S. Pat. No. 5,041,584. Suitable aluminoxanes may be obtained from commercial sources including Albemarle Corporation and Akzo-Nobel.

Suitable methods for combining the metallocene and cocatalyst to form the metallocene catalyst systems employed in the practice of this invention are well known and widely described in the art. The amount of aluminoxane and metallocene usefully employed in preparation of the catalytically active material can vary over a wide range. The mole ratio of aluminum atoms contained in the aluminoxane to metal atoms contained in the metallocene is generally in the range of from about 2:1 to about 100,000:1, preferably in the range of from about 10:1 to about 10,000:1, and more preferably in the range of from about 50:1 to about 2,000:1.

The reaction products of the metallocene and aluminoxane are generally solid materials that can be recovered by any well-known technique. For example, when produced in aliphatic solvents the solid material separates and can be recovered from the liquid by vacuum filtration or decantation; when produced in aromatic solvents the reaction products may be precipitated with a miscible non-solvent and then collected, or isolated by evaporating the solvent. The recovered catalytically active solid material may thereafter be dried under a stream of pure dry nitrogen or other inert gas, under vacuum, or by any other convenient manner.

The metallocene catalyst system may be employed directly for polymerization of olefins as a soluble catalyst, or may be supported on a suitable carrier such as, for example, finely divided silica, alumina, $MgCl_2$, zeolite, layered clays, mesoporous molecular sieves or the like. Particulate polymeric substrates such as a finely divided polyolefin have also been employed for this purpose. The particulate carriers preferably will have a particle diameter in the range of from 1 to 300 microns, and more preferably from 20 to 70 microns. Carriers may be used directly or pretreated with MAO before depositing the metallocene component, and MAO/silica substrates have been disclosed in the art for use in providing metallocene propylene polymerization catalyst systems. Preparative methods for producing fully active, supported metallocene catalyst systems useful in the practice of this invention are described and disclosed in the art, including in EP 567,952 and EP 578,838, and in EP 810,233. A variety of substrates suitable for use in the practice of the invention including MAO/silica substrates are available from commercial sources such as, for example, Witco Corporation. Particularly useful silica substrates are available from Grace-Davison, PQ Corporation, Crosfield Chemicals, and Degussa Corporation.

Generally, the supported catalyst may be prepared by depositing the metallocene component on an MAO/silica substrate from a slurry, then drying. In an alternative preferred procedure for the preparation of a supported catalyst system, the metallocene complex is applied to a suitable carrier, for example a dried silica slurried in an appropriate solvent such as, for example, toluene, then treated with MAO or other aluminoxane compound and metallocene complex. The mixture together with the slurried substrate may then be precipitated using a miscible nonsolvent such as dodecane, thereby depositing the catalyst components on the carrier. The catalyst will then be filtered and dried. Alternatively, the mixture may be evaporated to dryness.

The molar ratio of Al from the aluminoxane compound to Zr or other metal from the metallocene complex is from 50:1 to 2000:1, preferably from 100:1 to 1000:1, more preferably from 200:1 to 600:1. The amount of impregnating solution is chosen so that the carrier impregnated with the solution of metallocene complex and aluminoxane compound contains from 5 to 50 micro-mol of metallocene per gram after drying.

The active metallocene catalyst will be temporarily and reversibly passivated for use in the practice of this invention by contacting with an effective amount of a passivating compound to provide a latent metallocene catalyst. Compounds suitable for use as passivating compounds in the practice of this invention are unsaturated hydrocarbons selected from the group consisting of $C_4$–$C_{14}$ alkynes such as, for example, 1-hexyne, 3-hexyne, and the like, $C_4$–$C_{14}$ allenes such as 3-methyl-1,2-butadiene and the like, and polycyclic alkenes having an unreactive beta hydrogen, typically containing up to 20 carbon atoms, such as, for example, norbornylene, tetracyclo[$4.4.0.1^{2,5}.1^{7,10}$]-3-dodecene and the like.

The metallocene catalyst may be contacted with the passivator in any convenient manner, for example, by suspending the catalyst in a suitable liquid medium containing the passivator. The amount of passivator will generally be sufficient to provide from about 1 to about 5 equivalents of passivator per equivalent of metal in the catalyst complex. The temperature used in conducting the passivation will not be particularly critical, and the process thus may be conducted at any convenient temperature for a period of time sufficient to ensure complete reaction. Generally, temperatures at or below room temperature will suffice, although the passivation will proceed to completion more rapidly when conducted at an elevated temperature, as great as 50 to 100° C. or greater, and preferably at a temperature below the volatilization temperatures of the passivator and medium selected. The passivated or latent metallocene catalyst may then be collected by filtration and dried, or used directly without being isolated.

The latent metallocene catalyst, after being dispersed in the reactor, will be reactivated and combined with olefin monomer to carry out the polymerization. Ideally, latent catalyst placed in contact with olefin monomer will become thermally reactivated upon reaching polymerization temperature or shortly thereafter, and will not require an added activator component. However, depending on the particular combination of passivator and catalyst, thermal reactivation may occur very slowly under such conditions. Achieving acceptable levels of catalyst activity within a useful and practical time period may require adding an activator capable of reacting with the latent catalyst to displace and thereby remove the locking group. The activating agent will be selected in view of the particular passivating agent employed. Hydrogen, metal alkyls such as trialkylaluminum and the like are among the compounds that may be found suitable for this use.

While it is not intended that the invention be limited by a particular theory of operation, it appears that deactivation occurs by insertion of unsaturated hydrocarbon passivator into the metallocene complex to form a passivator-metallocene complex containing a bulky group that blocks or markedly retards the subsequent insertion of olefin monomer, which is necessary for olefin polymerization to take place. For example, treating a metallocene complex with norbornylene appears to form a norbornyl-metallocene complex that in turn inserts olefin monomer such as propylene at a very slow rate under the process conditions. Thus, little or no propylene polymerization will be observed. However, as propylene monomer becomes inserted into the complex the blocking group is displaced from the active site, forming an active polymerization catalyst species. The rate that the catalyst becomes reactivated will be influenced by several factors including monomer concentration and reaction temperature. Where the rate that this auto-reactivation process occurs is impracticably slow, an activator, for example, a compound capable of reducing or alkylating the blocking group such as, for example, hydrogen, an aluminum alkyl or the like, may be employed to remove the blocking group and regenerate the active metallocene catalyst complex. Hydrogen appears to be particularly effective in this regard, removing the blocking group by hydrogenolysis and forming an inert hydrocarbon species as a by product.

The amount of activator employed will depend in part upon the particular hydrocarbon component employed in passivating the metallocene catalyst and on the rate that thermal activation will take place in the reactor, as well as on the specific activator selected. The amount of activator will thus be selected to be an amount effective to provide an active polymerization catalyst for the monomers under the polymerization conditions employed in the process. Generally, where an added activator is employed the amount of activator that will be effective in this regard will lie in the range of from about 0.1 to about 100 equivalents, preferably from about 0.1 to about 10 equivalents per equivalent of unsaturated hydrocarbon moiety contained in the latent catalyst.

The latent catalyst compositions of this invention are useful in the polymerization of olefins, preferably alpha-olefins, to form polyolefins using any of the variety of polymerization processes known in the art for the production of polyolefins including in suspension, in solution in an inert liquid hydrocarbon, in bulk i.e. liquid monomer, and in stirred or fluidized bed gas phase polymerization processes and the like. As used herein, a "polyolefin" is meant to include homopolymers, copolymers, and terpolymers of such olefins and may optionally contain dienes, aromatic compounds with vinyl unsaturation and/or carbon monoxide.

Generally, olefin monomers suitable for these purposes will have from 2 to 14 carbon atoms and typically include, but are not limited to, ethylene, propylene, 1-butene, 1-pentene, 4-methyl-1-pentene, 1-hexene, styrene, substituted styrene and the like. Dienes that may optionally be polymerized with the olefins are those which are non-conjugated, and may be straight chain, branched chain or cyclic hydrocarbon dienes having from about 5 to about 15 carbon atoms. Examples of suitable straight chain, non-conjugated acyclic dienes include 1,4-hexadiene, 1,5-hexadiene, 1,7-octadiene, 1,9-decadiene and 1,6-octadiene; branched chain acyclic dienes such as 5-methyl-1,4-hexadiene, 3,7-dimethyl-1,6-octadiene, 3,7-dimethyl-1,7-octadiene and mixed isomers of dihydromyricene and dihydrocinene. Single ring alicyclic dienes such as 1,3-cyclopentadiene, 1,4-cyclohexadiene, 1,5-cycloctadiene and 1,5-cyclododecadiene and multi-ring alicyclic fused and bridged ring dienes such as tetrahydroindene, methyl tetrahydroindene, dicyclopentadiene, bicyclo-(2,2,1)-hepta-2,5-diene, alkenyl, alkylidene, cycloalkenyl and cycloalkylidene norbornenes such as 5-methylene-2-norbornene, 5-propenyl-2-norbornene, 5-isopropylidene-2-norbornene, 5-(4-cyclopentenyl)-2-norbornene, 5-cyclohexylidene-2-norbornene, 5-vinyl-2-norbornene and norbornadiene may also be found suitable.

Irrespective of the polymerization process employed, polymerization or copolymerization should be carried out at temperatures sufficiently high to ensure reasonable polymerization rates and avoid unduly long reactor residence times. Generally, temperatures range from about 0° to about 120° C. with a range of from about 20° C. to about 95° C. being preferred from the standpoint of attaining good catalyst performance and high production rates. More preferably, polymerization according to this invention is carried out at temperatures ranging from about 50° C. to about 80° C.

Olefin polymerization or copolymerization according to this invention may be carried out at monomer pressures of about atmospheric or above. Generally, monomer pressures range from about 20 to about 600 psi, although in vapor phase polymerizations the monomer pressures should not be below the vapor pressure at the polymerization temperature of the olefin to be polymerized or copolymerized.

The polymerization time will generally range from about ½ to several hours in batch processes with corresponding average residence times in continuous processes. Polymerization times ranging from about 1 to about 4 hours are typical in autoclave-type reactions. In slurry processes, the polymerization time can be regulated as desired. Polymerization times ranging from about ½ to several hours are generally sufficient in continuous slurry processes.

Inert hydrocarbon diluents suitable for use in slurry polymerization processes include alkanes and cycloalkanes such as pentane, hexane, heptane, n-octane, isooctane, cyclohexane, and methylcyclohexane; aromatics and alkylaromatics such as benzene, toluene, xylene, ethylbenzene, ethyl toluene and the like. It is often desirable to purify the polymerization medium prior to use, such as by distillation, percolation through molecular sieves, contacting with a scavenger compound such as an alkylaluminum compound capable of removing trace impurities, or by other suitable means.

Typical gas phase olefin polymerization reactor systems comprise at least one reactor vessel to which olefin monomer and catalyst components can be added and which contain an agitated bed of forming polymer particles. Typically, catalyst components are added together or separately through one or more valve-controlled ports in the single or first reactor vessel. Olefin monomer is typically provided to the reactor through a recycle gas system in which unreacted monomer removed as off-gas and fresh feed monomer are mixed and injected into the reactor vessel.

Irrespective of the particular process employed, polymerizations with the reactivated metallocene catalyst systems according to the invention will be carried out under conditions that exclude oxygen, water, and other materials that may act as catalyst poisons. Additives to control polymer or copolymer molecular weight such as, for example, hydrogen, may be employed in a manner well known to persons of skill in the art. Although not usually required, those skilled in the polymerization process art will understand that a suitable catalyst deactivator may be added upon completion to terminate polymerization.

Products produced in accordance with the process of this invention are normally solid polyolefins. Homopolymer or copolymer yields are sufficiently high relative to the amount of catalyst employed so that useful products can be obtained without separation of catalyst residues. The polymeric products produced in the presence of the invented catalyst may be fabricated into a variety of useful articles including moldings, fiber and film by extrusion, injection molding, and other methods well known in the art and commonly employed for compounding and fabricating such plastics.

The invention will be better understood by way of consideration of the following illustrative examples and comparison examples, which are provided by way of illustration and not in limitation thereof. In the examples, all parts and percentages are by weight unless otherwise specified.

EXAMPLES

Catalyst Preparations

Supported metallocene catalyst employed in the following examples was prepared by slurrying dimethylsilylbis(2-methyl-4,5-benzo[e]indenyl) zirconium dichloride, obtained from Boulder Scientific Corporation as BSC 366, and methylaluminoxane in toluene with MAO-treated silica gel, substantially according to the procedure of example 2 of published European patent application EP 810,233.

Generally, catalyst preparation, storage and transfer operations will be conducted using carefully dried reagents and vessels, and in a dry box containing an inert gas atmosphere, for example, dry nitrogen or argon.

Norbornylene-passivated catalyst was prepared by adding 0.55 g of the supported metallocene catalyst to an activated alumina-treated solution containing 7 g of norbornylene in 14 ml of heptane under dry conditions. The resulting slurry was stirred at 50° C. for 1 hr., and the catalyst was then isolated by filtration.

Passivated catalysts were also prepared using 3-hexyne, 1-hexyne, 3-methyl-1,2-butadiene and styrene as passivators. These were prepared substantially according to the process described for preparing norbornylene-passivated catalysts.

Catalysts employed as controls in the evaluations were slurried in heptane at 50° C. and isolated by filtration to provide comparable catalysts.

Screening Tests

Small scale, low-pressure slurry polymerizations were carried out as screening tests to demonstrate the effectiveness of an olefin as a passivating agent for metallocene catalysts. The screening tests were carried out in 250 ml pressure bottle reactors fitted with a magnetic stirring bar and a gas inlet. The bottles were dried and purged with nitrogen, placed in a drybox, and treated with 1.0 ml of a hexane solution of tri-isobutylaluminum (60 mg/ml) as a scavenger. The reactors were then charged with molecular sieve-dried hexane and catalyst. The bottles were sealed, removed from the drybox, placed in a heating bath preheated to the selected reaction temperature, positioned over the magnetic stirrer, and connected to a dried, nitrogen-purged manifold through the gas inlet. The system was purged and filled with propylene. Hydrogen was then added to the bottles to a predetermined pressure. With stirring initiated, propylene was then admitted continuously to maintain an operating pressure of approximately 80 psi. After a reaction period of 30 minutes, propylene flow was stopped, and excess propylene pressure was vented. The bottles were removed from the manifold, and the polymer was collected by filtration and dried.

In the following Examples 1–14, each example represents a total of six bottle reactor runs, 3 with passivated catalyst and 3 with the matching control catalyst. Reaction temperatures were selected to emulate the conditions encountered in a gas phase propylene polymerization reactor—50° C. for feedlines and 70° C. for the reactor bed. Reaction parameters, passivators, and amount of $H_2$ activator employed in each run, together with results averaged for successfully completed runs, are summarized in the following Table 1.

TABLE I

| Ex. no. | passivator | Temp °C. | Time min. | $H_2$ psi | [1]Control g/g/hr | [2]Passiv. Cat. Activity g/g/hr | [3]% |
|---|---|---|---|---|---|---|---|
| 1 | *norbornylene | 50 | 10 | 0 | 104.9 | 54.2 | 52 |
| 2 | norbornylene | 50 | 10 | 0 | 71.9 | 9.6 | 13 |
| 3 | norbornylene | 50 | 10 | 0 | 174.7 | 2.5 | 1 |
| 4 | norbornylene | 50 | 10 | 23 | 131.4 | 66.3 | 50 |
| 5 | norbornylene | 50 | 10 | 60 | 632.6 | 181.5 | 29 |
| 6 | norbornylene | 50 | 10 | 10 | 429.5 | 107.9 | 25 |
| 7 | norbornylene | 50 | 10 | 10 | 286.6 | 142.3 | 53 |
| 8 | norbornylene | 70 | 10 | 0 | 84.6 | 14.5 | 17 |
| 9 | norbornylene | 70 | 30 | 0 | 115.3 | 43.6 | 38 |
| 10 | norbornylene | 70 | 30 | 20 | 118.2 | 81.6 | 69 |
| 11 | norbornylene | 70 | 30 | 20 | 139.0 | 94.6 | 68 |
| 12 | 3-hexyne | 50 | 10 | 0 | 156.5 | 5.2 | 3 |
| 13 | 3-hexyne | 70 | 30 | 0 | 144.7 | 37.6 | 26 |
| 14 | 3-hexyne | 70 | 30 | 20 | 177.3 | 132.9 | 75 |
| 15 | 3-me-BDE[4] | 50 | 10 | 0 | 98.5 | 12.4 | 13 |
| 16 | 3-me-BDE** | 70 | 30 | 20 | 871 | 513 | 59 |
| 17 | 1-hexyne | 50 | 10 | 0 | 92.2 | 3.4 | 4 |
| 18 | 1-hexyne | 70 | 30 | 20 | 664.5 | 33.9 | 5 |
| 19 | styrene | 50 | 10 | 0 | 129.1 | 77.5 | 60 |

Notes:
[1]Control g/g/hr = amount of PP produced by control catalyst (averaged);
[2]Passivated Cat. Activity g/g/hr = amount of PP produced by passivated catalyst (averaged);
[3]% = ratio of passivated activity/control activity (× 100);
[4]3-me-BDE = 3-methyl-1,2-butadiene.
*catalyst passivation conducted at room temperature;
**only 1 control and 1 with passivated catalyst were run.

It will be seen from a consideration of the examples presented in Table I that catalysts passivated with a cyclic olefin such as norbornylene are substantially reduced in activity, producing little polymer under the feedline temperature condition, 50° C.; see Examples 1–3.

Norbornylene-passivated catalyst will be seen to become slowly activated with time when held at the polymerization reactor condition, 70° C.; see Examples 8 and 9. The further addition of hydrogen serves as an activator and produces a significant increase in polymerization activity, both at the feedline temperature condition (Examples 3–6) and at the polymerization reactor temperature (Examples 10 and 11).

Similar results were observed for catalysts passivated with an alkyne such as 3-hexyne. Passivation is effective at the lower (feedline) temperature condition, while at the higher (polymerization) temperature condition the catalyst becomes activated, slowly; compare Example 12 with Example 13. Adding hydrogen again reactivates the catalyst and substantially increases polymerization activity. See Example 14.

Similar results were also obtained with catalysts passivated with a non-conjugated, branched diene—3-methyl-1, 2-butadiene; see Examples 15 and 16. Catalysts were also successfully passivated with 1-hexyne, however the catalyst was not reactivated at 70° C., using hydrogen; see Examples 17 and 18. Catalysts are not adequately passivated for the purposes of this invention by treatment with styrene. Substantial polymerization took place using styrene-treated catalyst at 50° C.; see Example 19.

Triisobutylaluminum was also found to be effective for reactivating an inactive metallocene catalyst. An inactive supported zirconium metallocene catalyst, was prepared by adding MAO-treated silica to a solution of the metallocene in toluene, filtering, washing with pentane and drying. When added to a bottle reactor together with triisobutylaluminum and then contacting with liquid propylene monomer and held at 50° C. for one hour, polypropylene powder was obtained in good yield.

Gas Phase Polymerizations

The activity of passivated catalysts, and particularly the ability of such catalysts to remain passivated in a reactor bed for a period of time sufficient to allow them to be adequately dispersed in the catalyst bed, were assessed by conducting further propylene polymerizations using a laboratory gas-phase reactor.

These propylene polymerizations were performed in a one-gallon (3.8-liter) continuous, horizontal, cylindrical gas-phase reactor measuring 10 cm in diameter and 30 cm in length based on that described in U.S. Pat. No. 3,965,083. The reactor was equipped with an on-gas port for recycling reactor gas through a condenser and back through a recycle line to the recycle nozzles in the reactor. Propylene liquid was used as the quench liquid to help remove the heat generated in the reactor during the polymerization. During operation, polypropylene powder produced in the reactor bed, passed over a weir to be discharged through a powder discharge system into a secondary closed vessel blanketed with nitrogen. The polymer bed was agitated by paddles attached to a longitudinal shaft within the reactor that was rotated at about 50 rpm.

The reactor temperature and pressure were maintained at 70° C. and 300 psig (2100 kPa), respectively. The catalyst was introduced into the reactor either as a dry powder or dispersed in mineral oil through a liquid propylene-flushed catalyst addition nozzle. Hydrogen was fed to the reactor in order to maintain a powder melt flow rate of between 2.5–3 grams/10 minutes. The hydrogen was bled to the reactor through a feed port from a 300 cc pressure vessel charged with hydrogen. A specific pressure drop from the charging vessel can be correlated to a specific hydrogen concentration in the reactor which in turn corresponds to a specific polymer melt flow rate; production rate was about 0.5 lb/hr (225 g/hr).

Runs were made using catalysts passivated with 3-hexyne and with 1-hexyne. The catalysts were prepared in quantities sufficient for these larger runs, substantially following the processes outlined above for the screening runs. Catalyst passivation was also carried out following substantially the same procedure, however the passivation with 1-hexyne was carried out by stirring in dry hexane for 30 min. at room temperature, while the passivation with 3-hexyne was carried out in dry hexane, heated at 50° C. for approximately thirty minutes.

Triethylaluminum (TEA) diluted in heptane was added to the reactor with the catalyst. The TEA acts as a scavenger and may aid in the reactivation; hydrogen, supplied to control molecular weight, also aids in the reactivation. In the runs made with passivated catalyst, the catalyst was fed to the reactor with liquid propylene successfully without causing plugging of the feedlines. In a control run made using fully active catalyst, feedline plugging was avoided by dispersing the catalyst in mineral oil and pushing the catalyst mixture and TEA solution into the reactor through the feedline with liquid propylene.

The components and results of the runs are summarized in the following table, Table II.

TABLE II

| Run no. | passivator | TEA g/g | $H_2/C_3$ | Yield g/g | lumps wt. % | run time hr |
|---|---|---|---|---|---|---|
| 1 | 3-hexyne | 0.1 | $2.3 \times 10^{-4}$ | 1120 | 2 | 11 |
| 2 | 3-hexyne | 0.1 | $2 \times 10^{-3}$ | 1420 | 2.4 | 12 |
| 3 | 1-hexyne | 0.1 | $2 \times 10^{-3}$ | 1675 | 2.6 | 8 |

It will be seen from a consideration of the examples presented in Table II that passivated catalysts remain passivated after entering the reactor long enough to allow the catalyst to become dispersed within the polymer bed, thereby avoiding polymerization hotspots. In Runs 1–3, only minor amounts of lumps were formed; these were small—0.3–1.2 cm in diameter—and did not interfere with the polymerization. In a separate run using fully active metallocene catalyst dispersed in mineral oil, large lumps, ca. 50 cm. in diameter, formed, fouling the reactor bed and interfering with stirring, which necessitated shutting down the reactor for cleaning after about 12 hr. run time.

Catalyst yields for Runs 1–3 were approximately half the yields observed when a fully active supported catalyst is used. In the screening (bottle) runs, catalyst passivated with 1-hexyne was not reactivated by hydrogen at reactor temperatures. However, in the gas phase reactor, catalyst passivated with 1-hexene, Run 3, gave better a yield than observed when using catalyst passivated with 3-hexyne; see Runs 1 and 2.

The invention will thus be seen to be directed to a method for passivating fully active metallocene catalysts comprising a metallocene selected from Group 4 and Group 5 metallocenes and a cocatalyst such as an aluminoxane, the invented method comprising contacting the metallocene catalyst with from about 1 to about 5 equivalents, per equivalent of metal in the catalyst complex, of an unsaturated hydrocarbon passivator, said unsaturated hydrocarbon selected from the group consisting of $C_4$–$C_{14}$ alkynes, $C_4$–$C_{14}$ allenes and cycloalkenes.

The activity of the passivated metallocene catalysts obtained according to the method of this invention, as determined by catalyst yield in an olefin polymerization in the absence of an activator, may be reduced to less than about 20%, preferably less than about 15%, still more preferably from 0 to about 10% of the activity of the metallocene catalyst under comparable conditions prior to being passivated. Catalyst activities for the comparison may be determined using any of a variety of polymerization processes and conditions. Data for the comparisons may be conveniently obtained using a catalyzed low pressure suspension polymerization process carried out with propylene monomer at 50° C. in the absence of an activator, substantially as outlined herein above. Those skilled in the art will recognize that the process conditions may be modified to accommodate other olefin monomers.

Passivated metallocene catalysts produced according to the invention may be further described and characterized as latent olefin polymerization catalysts comprising a Group 4 or Group 5 metallocene, an aluminoxane and an unsaturated hydrocarbon passivator selected from the group consisting of $C_4$–$C_{14}$ alkynes, $C_4$–$C_{14}$ non-conjugated branched alkadienes and cycloalkenes, preferably polycyclic alkenes having an unreactive beta hydrogen.

The passivation is temporary or reversible. The invented latent olefin polymerization catalysts may become reactivated after a period of time under polymerization conditions, or may be reactivated using an activator, for example hydrogen, or a compound capable of alkylating the unsaturated hydrocarbon moiety of the latent catalyst, for example, a metal alkyl such as an alkylaluminum compound. The reactivated catalysts are effective as olefin polymerization catalysts and are thus useful in polymerization processes for the production of polyolefins such as polypropylene. The invention thus may be further understood as directed to a process for the polymerization of $C_2$–$C_{14}$ olefins in the presence of a metallocene catalyst system wherein said catalyst is temporarily and reversibly passivated by contacting with an unsaturated hydrocarbon passivator, dispersed in the polymerization medium, and subsequently becomes reactivated under process conditions.

Although the invention has been described and exemplified using specific metallocene catalysts comprising zirconium metallocenes and aluminoxane cocatalysts, the invented method may be applied to a variety of metallocene catalyst systems including those based on other Groups 4 and 5 metals and other cocatalysts such as boron compounds and the like. Further, unsaturated hydrocarbons other than those exemplified may also be found useful for these purposes. Those skilled in the art will readily understand that the examples set forth herein above are provided by way of illustration, and are not intended to limit the scope of the invention defined by the appended claims.

That which is claimed is:

1. A method for temporarily and reversibly passivating an active metallocene catalyst system by contacting said catalyst system with an unsaturated hydrocarbon selected from the group consisting of $C_4$–$C_{14}$ alkynes, $C_4$–$C_{14}$ allenes and polycyclic alkenes having an unreactive beta hydrogen.

2. The method of claim 1 wherein said metallocene catalyst system comprises a Group 4 or Group 5 metallocene and a cocatalyst.

3. The method of claim 1 wherein said metallocene catalyst system comprises a zirconium metallocene and an aluminoxane.

4. The method of claim 1 wherein said hydrocarbon is selected from the group consisting of 1-hexyne, 3-hexyne, 3-methyl-1,2,butadiene, norbomylene, and tetracyclo [$4.4.0.1^{2,5}.1^{7,10}$]-3-dodecene.

5. The method of claim 1 wherein said metallocene catalyst system is a supported metallocene catalyst system comprising a Group 4 or Group 5 metallocene, a cocatalyst end a suitable carder.

6. The method of claim 1 wherein the activity of said catalyst system after contacting with said unsaturated hydrocarbon, as determined by catalyst yield en an olefin polymerization process, is no greater than 20% of the activity of the catalyst system before contacting with said unsaturated hydrocarbon.

7. The method of claim 1 wherein an active supported metallocene catalyst system comprising a zirconium metallocene, an aluminoxane and a suitable carrier is temporarily and reversibly passivated by contacting said catalyst system with from about 1 to about 5 equivalents, per equivalent of zirconium, of said unsaturated hydrocarbon, said catalyst system after contacting with said unsaturated hydrocarbon having an activity as determined by catalyst yield in an olefin polymerization process, no greater than 20% of the activity of the catalyst system before contacting with said unsaturated hydrocarbon.

8. A latent olefin polymerization catalyst comprising a Group 4 or Group 5 metallocene, a cocatalyst and an unsaturated hydrocarbon passivator selected from the group consisting of $C_1$–$C_{14}$ alkynes, $C_4$–$C_{14}$ allenes and polycyclic alkenes having an unreactive beta hydrogen.

9. The catalyst of claim 8 comprising a zirconium metallocene and an aluminoxane.

10. The catalyst of claim 8 wherein said hydrocarbon is selected from the group consisting of 1-hexyne, 3-hexyne, 3-methyl-1,2,butadiene, norbornylene, and tetracyclo [$4.4.0.1^{2,5}.1^{7,10}$]-3-dodecene.

11. The catalyst of claim 8 comprising a zirconium metallocene, an aluminoxane, a suitable carrier, and from about 1 to about 5 equivalents, per equivalent of zirconium, of the unsaturated hydrocarbon.

* * * * *